May 20, 1952

G. D. HARRAH 2,597,481

DRIVE AXLE MOUNTING FOR MAINTAINING
DRIVE SHAFT ALIGNMENT

Filed May 18, 1948

INVENTOR
George D. Harrah
BY Ely J. Frye
Attys.

May 20, 1952

G. D. HARRAH 2,597,481

DRIVE AXLE MOUNTING FOR MAINTAINING
DRIVE SHAFT ALIGNMENT

Filed May 18, 1948

INVENTOR
George D. Harrah
BY Ely & Frye
attys.

May 20, 1952  G. D. HARRAH  2,597,481
DRIVE AXLE MOUNTING FOR MAINTAINING
DRIVE SHAFT ALIGNMENT
Filed May 18, 1948  4 Sheets-Sheet 3
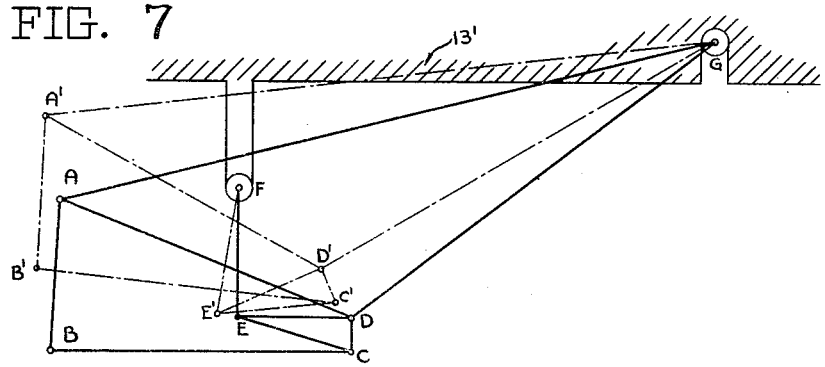
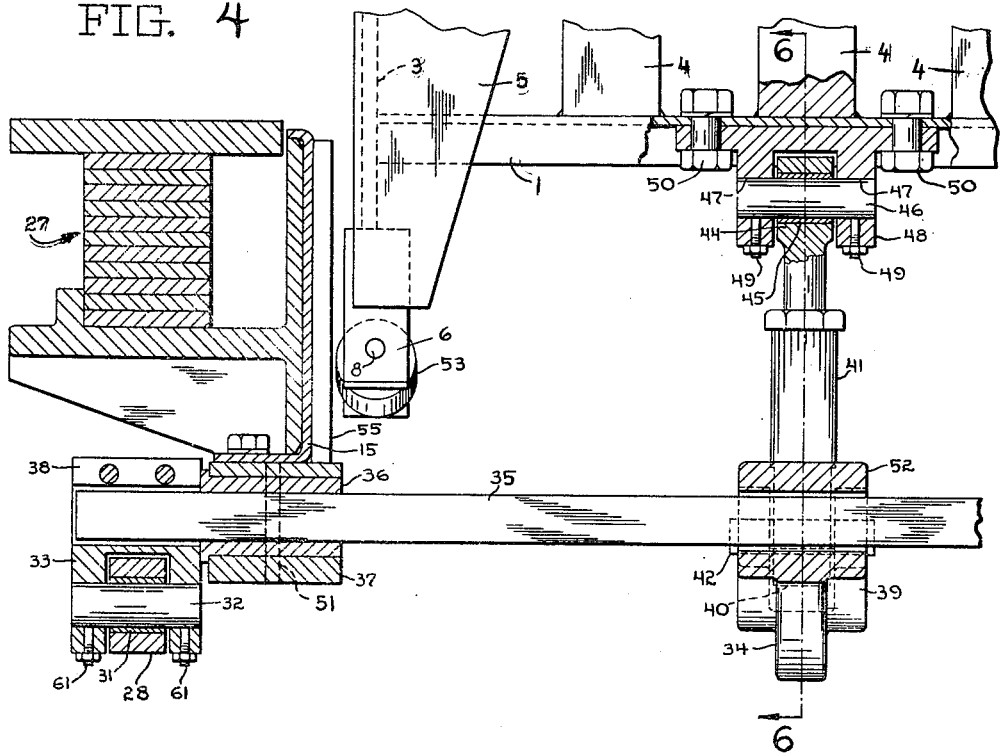
INVENTOR
George D. Harrah
BY Ely & Frye
Attys.

May 20, 1952

G. D. HARRAH 2,597,481

DRIVE AXLE MOUNTING FOR MAINTAINING
DRIVE SHAFT ALIGNMENT

Filed May 18, 1948

INVENTOR
George D. Harrah
BY
Attys.

Patented May 20, 1952

2,597,481

UNITED STATES PATENT OFFICE 2,597,481

DRIVE AXLE MOUNTING FOR MAINTAINING DRIVE SHAFT ALIGNMENT

George D. Harrah, Canton, Ohio, assignor to The Oyler Motor Transit Company, Canton, Ohio, a corporation of Ohio Application May 18, 1948, Serial No. 27,688

2 Claims. (Cl. 180—22)

This invention relates to a propeller shaft connection for vehicles, and in particular to a mechanism adapted for use with a live axle which is subjected to large amplitudes of pitching with respect to the vehicle chassis, such as is encountered, for instance in the dual bogies with universal articulation shown in the U. S. Patent to Otto Oyler No. 2,460,429.

In the patent the bogies each have, among other actions, a separate and independent pitching action about a horizontal axis transverse to the vehicle chassis. The dual bogie described is adapted for use with a trailer or with a truck, the virtue in the latter case arising from the fact that a truck may be lengthened to increase the pay load, while maintaining a reasonable distribution of the load on a double set of rear wheels and minimizing tire wear incident to non-rectilinear travel. There is a present trend toward restriction on the use of tandem-type vehicles. The use of the described dual bogie provides a solution to the difficulties involved by increasing the possible length of a non-articulated truck chassis.

In the use of a propeller shaft which is inclined with respect to a longitudinal axis of a vehicle, certain defects are resident which are not of sufficient magnitude to warrant their abatement in propeller shafts of conventional length and inclination, and in which the connection on the output end is not subject to oscillations of any great amplitude. The said defects comprise a tendency toward wear in the splined or other universal connection and in a cyclic variation in speed from a high to a low value for each revolution of the propeller shaft which leads to undue tire wear, among other things.

The cyclic variation in speed in a slanting shaft will be neutralized if the input and output members on the respective ends of the propeller shaft make equal angles with the axis of the shaft, and in ordinary vehicles they are thus arranged, departures from the ideal arrangement during service being negligible due to the short length of the shaft and comparatively minor amplitude of up-and-down movement of the driven axle relative to the vehicle chassis. In employing a driven axle subject to up-and-down movements of considerable amplitude, the angularity of the connections with the propeller shaft cannot be ignored. According to the present invention, I have succeeded in overcoming this difficulty by providing a linkage in the suspension of the driven axle which automatically adjusts the angularity in the universal connection in correspondence with the varying distance of the said connection from the vehicle chassis consequent upon differences in the road level at the various pairs of wheels, and other causes. If the universal link to the driven axle were rigid with respect to the bogie or other axle mounting, it would, on lowering with respect to the vehicle chassis, swing in an arc and thus be subject to variation in its inclination to the vertical and, in a more aggravated sense, in its inclination to the propeller shaft which will also be varying in inclination to the vertical. The results, at high amplitudes, are undue play in the universal spline, inefficient universal action and an inequality between the angle at the rear universal and the front universal, the feed-in shaft to the latter being horizontal at all times.

The difficulties are obviated by the use of the linkage referred to above, which, in the embodiment shown, comprises what is substantially a parallel linkage and which maintains a substantially constant inclination of the propeller link leading to the rear axle.

It is therefore an object of the present invention to provide an improved universal drive for vehicles, a further object being to provide a universal connection for vehicles in which input and output links are maintained at substantially equal angles to the propeller shaft. Another object is to provide a universal drive shaft which is not subject to undue wear and malfunctioning when connected to a driven axle which is subject to large amplitudes of swing to and from the vehicle chassis.

To these and other ends which will become manifest as the description proceeds, the invention consists in certain embodiments, a preferred form of which is described in the following specification and illustrated in the drawings in which:

Fig. 4 is a section taken on the line 4—4 of Fig. 3, and with a forward part broken away;

Fig. 7 is a schematic representation of the novel linkage.

Figure 1:
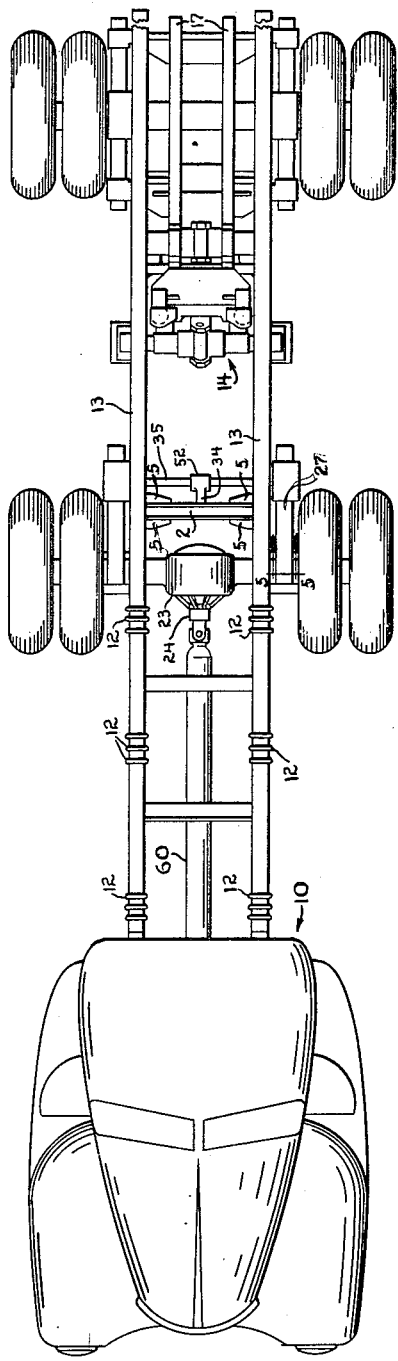
Fig. 1 is a top plan view of a truck chassis employing the improved propeller shaft connection.
Figure 2:
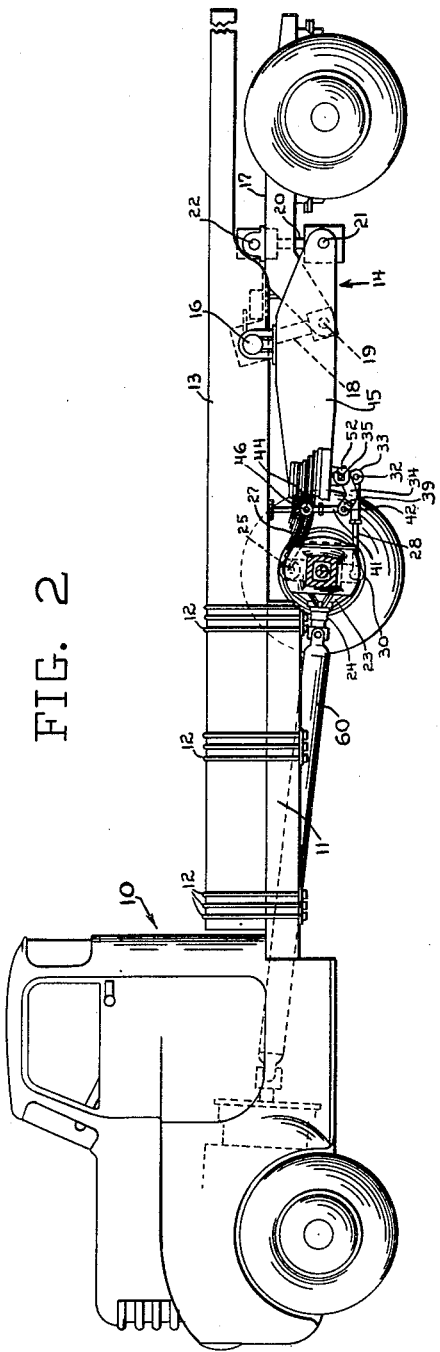
Fig. 2 is a side elevation of the truck chassis of Fig. 1 with one wheel removed to show the novel linkage.

Referring to the drawings by characters of reference, there is shown in Figs. 1 and 2 a truck chassis with a forward engine and driving compartment, all shown generally at 10. This forward unit carries a relatively short pair of frame members 11 to which are attached as by straps 12 the much longer and sturdier frame members 13. This lap connection of the frame members has been shown to illustrate the conversion of an existing chassis to one adapted for increased payloads, but it will be understood that the construction could comprise a pair of single frame members.

In the use of a chassis of this length, conventional wheel supports are inadequate for the increased load. Obviously, a single set of rear wheels would not suffice and would furthermore require an unduly long propeller shaft. The same is true of tandem wheel trucks with which a somewhat greater load can be sustained but which do not attain an optimum and do not provide for proper load distribution. Likewise, tire wear on rounding curves is a factor which is present. Even if a separate wheel truck is placed medially of the chassis to distribute load and shorten the propeller shaft, tire wear is still a serious consideration.

On the whole, the problem of long chassis is best solved by the use of the dual bogies, universally articulated, which were referred to above. These are best seen in Fig. 2, where the articulation is indicated generally by the numeral 14. The front bogie 15 is suspended from a main trunnion 16 journalled in the frame members 13, and the single motion of the front bogie is an up-and-down movement about the axis of the trunnion 16. The rear bogie 17 connects to the chassis 13 through a hanger 18 which is swingable about the main trunnion 16, the rear bogie having a connection with the hanger 18 at 19 which is swivelled about the axis of the hanger and about an axis parallel to the axis of the main trunnion 16. Another hanger 20 is similarly connected as at 21 with the rear of the front bogie 15 for universal motion, and is swivelled at its top to a trunnion 22 carried by the rear bogie 17. With this arrangement, the two bogies follow the character of the terrain independently, each of the other, while maintaining at all times an even distribution of the load, and the rear bogie tracks the front perfectly on turns. The motion of the front bogie is limited to a bobbing action about the main trunnion 16, and it is this motion on a comparatively long radius, to which the novel universal suspension is especially applicable.

Figure 3:
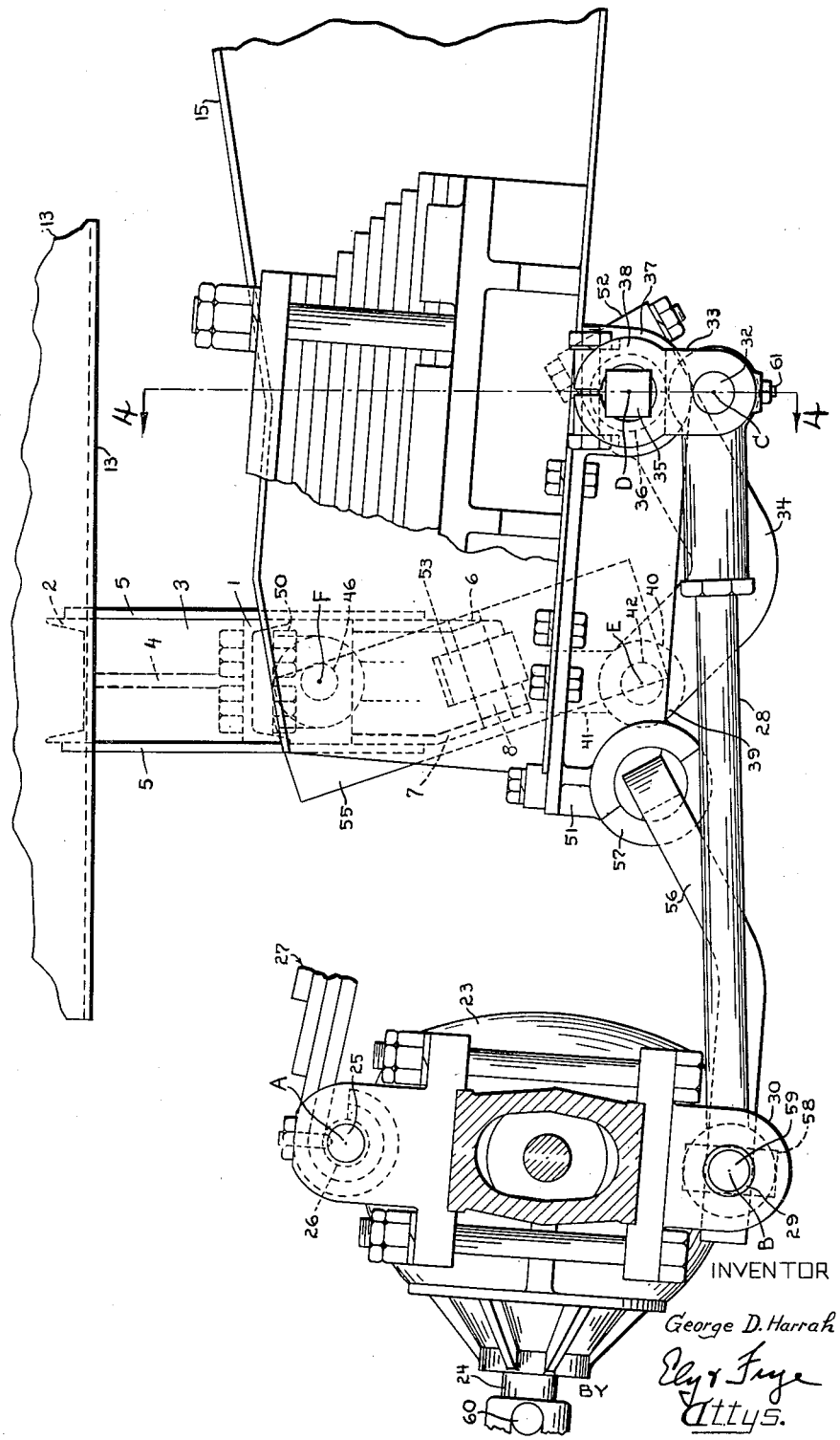
Fig. 3 is an enlarged fragmentary view showing the novel linkage.
Figure 5:
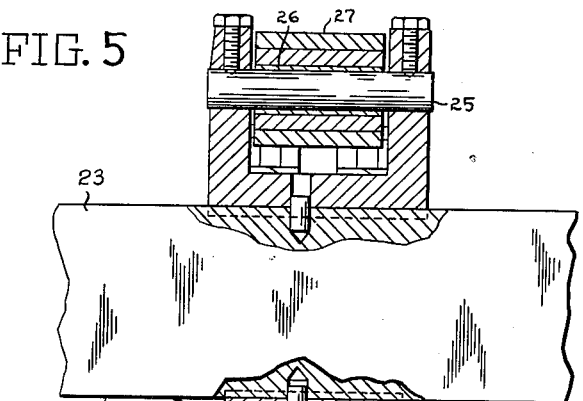
Fig. 5 is a section taken on the line 5—5 of Fig. 3.

Referring, therefore, to Fig. 3, there is shown an axle housing 23 and a link 24 leading thereto from the universal connection with the propeller shaft 60. In order to accomplish the objects of the invention, it is desired to keep the axle housing 23 and link 24 in a constant alignment respecting the vertical while the angle of the propeller shaft varies. This is accomplished by a linkage control functioning about the several axes indicated by the letters A, B, C, D, E and F, and having a link between each pair of axes in the chain as enumerated. Thus, from A to B the link comprises the axle housing 23 which swivels at its top through a pin 25 journalled in a bearing sleeve 26 held in a loop at the end of the spring unit 27, which latter forms the upper connection between the axle housing 23 and the front bogie 15. From B to C the link comprises a threadedly adjustable telescopic double eye-bolt 28 having one end engaging a bearing sleeve 29 fitted in a lower fork 30 (Fig. 5) on the axle housing 23, and the other end engaging a bearing sleeve 31 (Fig. 4) fitted on a pin 32 which is held in place in a bore in a member 33 as by set-screws 61. The member 33 constitutes a short link between C and D and is keyed to a rigid L-shaped link 34 extending from D to E through a square shaft 35, to which the said member 33 is attached by a split collar 38, broached to receive the corners of the square shaft. The two links 33 and 34 therefore are, in effect, a bell-crank and remain at a fixed angle relative to one another while their keyed juncture rotates about the axis D through a bearing sleeve 36 which is also keyed to the square shaft 35 and is journalled in a depending lug 37 on a web plate 51 bolted to the underside of the front bogie.

The link elements and journals thus far described have their counterparts on the opposite side of the bogie and axle housing. However, the link between D and E and the link between E and F are centrally located (Fig. 4) and the square shaft 35 extends from one side of the bogie to the other.

Figure 6:
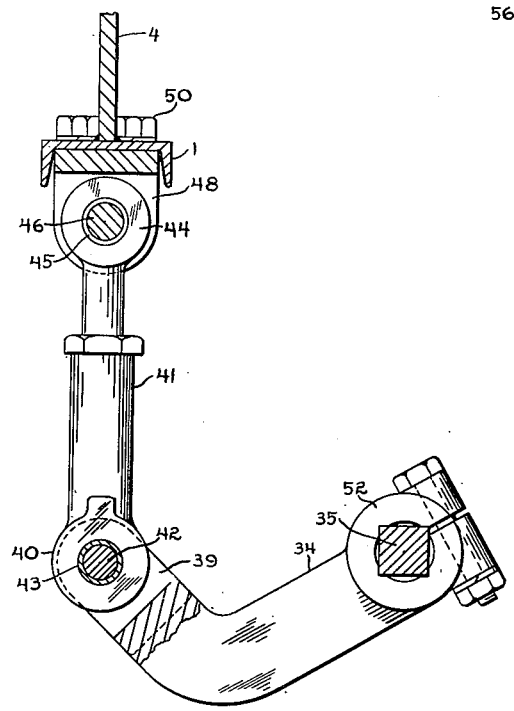
Fig. 6 is a section taken on the line 6—6 of Fig. 4.

As in the case of the short link 33, the L-shaped link 34 is keyed to the square shaft 35 through a broached, split collar 52, and is articulated at its forward end, through a fork 39 (Fig. 6) to the lower eye 40 of a two-part, threadedly telescoped link 41 through a pin 42 in a bearing sleeve 43. The upper eye 44 has a bearing sleeve 45 surrounding a pin 46 which is locked in place in two axially aligned bores 47 in a depending U-bracket 48 by set screws 49, the bracket being fixed, as by bolts 50, to a cross channel 1 secured to structure depending from the chassis. This structure includes an upper, cross channel 2 fixed to and extending between the inner faces of chassis frame members 13. A pair of end plates 3 connect the upper and lower channels 2, 1, and the assembly is further strengthened, centrally, by a series of vertical plates 4, fixed at their ends to the respective channels, and at the ends by pairs of wedge-form plates 5.

The linkage just described comprises all the essential features of the aligning means for the universal connection with the propeller shaft. However, before describing the operation, certain other structural features closely adjacent the linkage, and shown in the drawing, will be described.

In Fig. 4 there is shown a guide means to limit side thrust in the front bogie which comprises, at each side of the chassis, a roller 53 carried by a pair of brackets 6, 7, welded to plates 5, and having their lower ends appropriately bent to provide a slant in the axis of the pin 8 carrying roller 53. A guideway 55 is carried by the frame of the front bogie at an angle similar to that of the roller 53 and limits sidewise motion of the front of the front bogie by anti-friction contact with the roller at various points in the up-and-down movement of the bogie.

A square section stabilizer 56 has a portion transversely of the bogie which passes through a depending journal 57 of the web plate 51 on each side of the bogie. The free ends of the stabilizer each engage with the axle housing 23, as shown in detail in Fig. 5, through a fork 58 on the end of a pin 59 which also serves to support the bearing sleeve 29 on which the forward end of the link 28 rotates.

The action of the compensating linkage is best understood by reference to the schematic representation in Fig. 7. Here the swivel points bear the same reference letters as in Fig. 3, and the point G has been added to represent the axis of the main trunnion 16 of the bogies. All links are shown as straight lines between the swivel points. The points F and G are shown as fixed to a schematic chassis 13'. Since the points AD and G are part of the front bogie and fixed relative to each other, except for slight variations due to flexure in the relatively short spring 27, they are shown, for simplicity, in the schematic view, as connected to form a fixed triangle which swings as a whole about the point G. Likewise, links CD and DE, being keyed, maintain fixed angular relation to each other, and this relation is clearly brought out in the schematic showing by supplying side EC to form another fixed triangle which swivels about the point D.

If both of the points A and B were fixed in relation to the front bogie, rocking of the bogie clockwise about the point G would result in an inclination of the line AB in a positive angle with the vertical, or, more exactly, with a perpendicular to the truck chassis. However, the point B is not rigid with the bogie, but is positionally controlled by the linkage as follows:

As point A moves clockwise, lines AG and DG move through equal angles. The link EF will move through a slight angle to accommodate the approach of the point D. Otherwise, the link EF acts as a fulcrum whereby, under the influence of the swing of the point D about radius DG the triangle CDE is turned about the point E. This results in a generally counter-clockwise motion of the line CD with the result that the point B moves with a counter-clockwise motion of the line AB about the point A, thus maintaining the inclination of the line AB relative to the chassis 13'. As a direct consequence of this compensating action, the angle at the output end of the propeller shaft is minimized and maintained at substantially the same value as the angle at the input end. The foregoing action of the linkage is shown in phantom in Fig. 7 with the pivot axes indicated by primed letters. It will be noted that line AB maintains a constant angle with the vertical for all positions of the linkwork.

While a particular embodiment of my invention has been shown for purposes of illustration, it will be understood that various modifications are possible and I do not desire that my invention shall be construed as limited except as shall appear from the spirit and scope of the appended claims.

In particular, while the invention has been shown as applied to a bogie of high amplitude of swing, it is equally applicable to any driven axle connection without regard to the amount of motion thereof. Also, where I have mentioned substantially equal angles between the input and output shafts and the propeller shaft, this should be interpreted as meaning an equality sufficient to obviate all but reasonable wear in the universal connection.

What is claimed is:

1. In combination, a vehicle chassis, a bogie pivoted to said chassis, a driven-axle housing pivoted at its upper portion on said bogie remote from the axis of pivoting of said bogie on said chassis, whereby to be swingable through an arc to and from said chassis, a bell crank on said bogie, a first link, one end of said first link being pivotally connected to one arm of said bell crank and the other end of said first link being pivotally connected to said chassis, and a second link, one end of said second link being pivotally connected to the other arm of said bell crank and the other end of said second link being pivotally connected to a lower portion of said axle housing.

2. In combination, a vehicle chassis, a bogie pivoted to said chassis, a driven axle housing pivoted on both ends at its upper portion on said bogie remote from the axis of pivoting of said bogie on said chassis, whereby to be swingable in an arc to and from said chassis, a shaft extending beneath the chassis transversely thereof and journaled in the bogie, an arm carried by the said shaft medially thereof and rotatable therewith, a first link pivotally connected at one of its ends to said arm and pivotally connected at its other end to said chassis, a pair of arms carried by the shaft on each side of the first-mentioned arm and also rotatable with the said shaft, and a pair of second links, each of said second links being pivotally connected at one of its ends to one of said pair of arms, and the other end of each of said second links being pivotally secured to the lower part of the said axle housing.

GEORGE D. HARRAH.

REFERENCES CITED

The following references are of record in the file of this patent:

UNITED STATES PATENTS

| Number | Name | Date |
| --- | --- | --- |
| 1,572,561 | Rose | Feb. 9, 1926 |
| 2,041,484 | Quartullo | May 19, 1936 |
| 2,112,811 | Hendrickson | Mar. 29, 1938 |
| 2,144,435 | Wicker | Jan. 17, 1939 |
| 2,200,658 | Singleton | May 14, 1940 |
| 2,356,375 | Brantingham | Aug. 22, 1944 |
| 2,471,992 | Wicker | May 31, 1949 |

FOREIGN PATENTS

| Number | Country | Date |
| --- | --- | --- |
| 18,792 | Denmark | May 11, 1914 |
| 447,569 | Germany | Oct. 12, 1927 |
| 449,643 | Great Britain | July 1, 1936 |